US006427717B1

(12) United States Patent
Kimura

(10) Patent No.: US 6,427,717 B1
(45) Date of Patent: Aug. 6, 2002

(54) PROCESS SOLUTION SUPPLYING APPARATUS AND FLUID PASSAGEWAY OPENING-CLOSING VALVE DEVICE FOR PROCESS SOLUTION SUPPLYING APPARATUS

(75) Inventor: Yoshio Kimura, Kikuchi-gun (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 09/340,963

(22) Filed: Jun. 28, 1999

(30) Foreign Application Priority Data

Jul. 2, 1998 (JP) ............................... 10-187487

(51) Int. Cl.⁷ .................... F16K 49/00; F16L 53/00; F28D 7/10
(52) U.S. Cl. ........................ 137/340; 165/154
(58) Field of Search ..................... 137/340, 375; 251/148, 152–153, 155–156; 118/620, 641; 165/154; 122/136 R, 138, 140.1, 140.2, 158

(56) References Cited

U.S. PATENT DOCUMENTS 3,901,269 A * 8/1975 Henderson ............... 137/340
4,610,298 A * 9/1986 van Schagen et al. ......... 165/39
5,287,913 A * 2/1994 Dunning et al. ............... 165/26
5,695,817 A * 12/1997 Tateyama et al. ........... 427/240
5,960,225 A * 9/1999 Fujimoto ..................... 396/611
5,962,070 A * 10/1999 Mitsuhashi et al. ......... 427/240

FOREIGN PATENT DOCUMENTS

| JP | 2-191571 | 7/1990 |
| JP | 4-115520 | 4/1992 |

* cited by examiner

*Primary Examiner*—Richard Crispino
*Assistant Examiner*—Kevin P. Shortsle
(74) *Attorney, Agent, or Firm*—Fulbright & Jaworski L.L.P.

(57) ABSTRACT

A process solution supplying apparatus for supplying a process solution onto a substrate to be processed, comprising a process solution supply source, a process solution supply tube having its upstream end connected to the process solution supply source and serving to discharge the process solution from the downstream end thereof onto the substrate, a fluid passageway opening-closing valve device mounted on a downstream side of the process solution supply tube for opening-closing the process solution supply tube, and a temperature adjusting solution tube, through which flows a temperature adjusting solution, arranged continuously through the fluid passageway opening-closing valve device in a downstream portion of the process solution supply tube including the fluid passageway opening-closing valve device for adjusting the temperature of the process solution within the process solution supply tube.

1 Claim, 6 Drawing Sheets

PROCESS SOLUTION SUPPLYING APPARATUS AND FLUID PASSAGEWAY OPENING-CLOSING VALVE DEVICE FOR PROCESS SOLUTION SUPPLYING APPARATUS

BACKGROUND OF THE INVENTION

The present invention relates to a process solution supplying apparatus for supplying a process solution such as a developing solution or a resist solution to a target substrate to be processed such as a semiconductor wafer or an LCD substrate, particularly, to a process solution supplying apparatus capable of supplying a process solution adjusted at a desired temperature to a target substrate and to a fluid passageway opening-closing valve device used in the particular process solution supplying apparatus.

The photolithography technology employed in the process of manufacturing a semiconductor device includes the step of supplying a process solution such as a developing solution or a resist solution onto the surface of a semiconductor wafer. With progress in the degrees of fineness and integration of a semiconductor circuit pattern in recent years, it is of high importance nowadays to control the temperature of the process solutions at a very high accuracy.

FIG. 1 shows the construction of a conventional developing solution supplying apparatus. As shown in the drawing, the apparatus includes a developing solution supply tube 100. The upstream end of the tube 100 is connected to a developing solution supply source 101, with the downstream end being connected to a supply nozzle 102 of a developing device. The developing solution within the developing solution supply source 101 is circulated by a pump 103 through the developing solution supply tube 100 into a temperature adjusting device 104. A temperature adjusting water 105 is circulated about the developing solution supply tube 100 so as to adjust the developing solution at a desired temperature within the temperature adjusting device 104.

A fluid passageway opening-closing valve device 106 is mounted to the developing solution supply tube 100 downstream of the temperature adjusting device 104 to control the flow rate of the temperature-adjusted developing solution supplied to the nozzle 102. It follows that the temperature-adjusted developing solution is discharged through the nozzle 102 onto a semiconductor wafer at a desired rate. Further, a temperature adjusting water 107 withdrawn from the temperature adjusting device 104 is circulated about the developing solution supply tube 100 in the vicinity of the nozzle 102 so as to control finally the temperature of the developing solution discharged onto the wafer.

However, in the conventional developing solution supply device of the construction described above, the fluid passageway opening-closing valve device 106 is interposed between the temperature adjusting device 104 and the supply nozzle 102. In addition, a suitable temperature control is not applied to the developing solution in the region of the fluid passageway opening-closing valve 106. It follows that the developing solution is susceptible to a disturbance to cause the temperature of the developing solution to be changed easily.

A process solution valve provided with a temperature adjusting circuit is disclosed in, for example, Japanese Patent Disclosure (Kokai) No. 6-201065. The process solution valve disclosed in this prior art is considered to be capable of overcoming the above-noted problem. In the process solution valve disclosed in this prior art, a fluid passageway for the temperature adjusting water (temperature adjusting circuit) is arranged in the vicinity of the process solution passageway within the body of the valve so as to allow the temperature of the process solution to be adjusted even within the process solution valve.

To be more specific, the body of the process solution valve is provided with an inlet port of a temperature adjusting water for supplying the temperature adjusting water into the temperature adjusting circuit and a temperature adjusting water outlet port for discharging the temperature adjusting water. These inlet port and outlet port of the temperature adjusting water are arranged in the side surfaces of the valve body so as not to interfere with the inlet port and outlet port of the process solution.

However, even if the particular process solution valve is used as the fluid passageway opening-closing valve device 106, it is impossible to perform the temperature control of the developing solution continuously.

To be more specific, where the process solution valve disclosed in JP '065 pointed out above is used as the fluid passageway opening-closing valve device 106, it is certainly possible to adjust the temperature of the developing solution within the fluid passageway opening-closing valve 106 by adding tubes as denoted by dotted lines in FIG. 1. However, it is impossible to adjust the temperature of the developing solution in region A between the temperature adjusting device 104 and the fluid passageway opening-closing valve device 106 and in region B between the fluid passageway opening-closing valve 106 and the supply nozzle 102.

It may be possible to overcome the above-noted problem by arranging the temperature adjusting device 104, the fluid passageway opening-closing valve device 106 and the supply nozzle 102 close to each other. However, it is impossible to arrange these devices very close to each other in view of the required installing positions of these devices and the required arrangement of the developing solution supply tube 100. In addition, since it is necessary to connect each of the inlet port and the outlet port of the fluid passageway opening-closing valve 106 to the developing solution supply tube 100 by using, for example, nuts 109 and 110, respectively, a space for inserting a tool must be ensured. Therefore, the devices 104, 106 and 102 must be arranged apart from each other.

It should also be noted that temperature adjusting manifolds 111 for guiding the temperature adjusting water streams 105 and 107 are arranged in the conventional developing solution supplying apparatus shown in FIG. 1. Since it is necessary to use many temperature adjusting manifolds 11, the piping construction is rendered complex and the entire apparatus tends to be rendered bulky.

Further, in the construction employing the process solution valve disclosed in JP '065, the tubes for the temperature adjusting water as denoted by dotted lines in FIG. 1 must be connected to the inlet port and outlet port of the temperature adjusting water on the side surfaces of the valve body separately from the connecting portions of the developing solution supply tube 100 to the fluid passageway opening-closing valve device 106. It follows that the piping arrangement is rendered complex, and the apparatus tends to be rendered bulky.

BRIEF SUMMARY OF THE INVENTION

A main object of the present invention, which has been achieved in view of the situation described above, is to provide a process solution supplying apparatus that makes it possible to adjust continuously the temperature of the process solution flowing through a process solution supply tube.

Another object of the present invention is to simplify the construction of a temperature adjusting water supply tube included in a process solution supplying apparatus that permits adjusting the temperature of the process solution.

According to a first aspect of the present invention, there is provided a process solution supplying apparatus for supplying a process solution onto a target substrate to be processed, comprising a process solution supply source, a process solution supply tube having its upstream end connected to the process solution supply source and serving to discharge the process solution from the downstream end thereof onto the target substrate, a fluid passageway opening-closing valve device mounted on a downstream side of the process solution supply tube for opening-closing the process solution supply tube, and a temperature adjusting medium arranged continuously through the fluid passageway opening-closing valve device in a downstream portion of the process solution supply tube including the fluid passageway opening-closing valve device for adjusting the temperature of the process solution within the process solution supply tube.

In the apparatus of the particular construction described above, the temperature of the process solution can be adjusted continuously on a downstream side of the process solution supply tube having a fluid passageway opening-closing valve device mounted thereto. Also, it is possible to decrease the number of manifolds for branching the stream of the temperature adjusting medium (temperature ..adjusting solution) so as to simplify the construction of the apparatus and to make the apparatus compact.

It is desirable for the process solution supplying apparatus of the present invention to be incorporated in a developing device or a resist coating device included in the apparatus for manufacturing a semiconductor device. In this case, the apparatus of the present invention permits markedly improving the quality of the manufactured semiconductor device.

According to one embodiment of the present invention, it is desirable for the temperature adjusting member to be a temperature adjusting solution controlled at a desired temperature. A temperature adjusting tube through which flows the temperature adjusting solution is arranged around the process solution supply tube. Also, the fluid passageway opening-closing valve device is provided with a process solution passageway through which flows the process solution and a temperature adjusting solution passageway through which flows the temperature adjusting solution. These fluid passageways and are connected to the process solution supply tube and the temperature adjusting solution tube, respectively.

In the construction described above, it is possible to use a double tube consisting of an inner tube acting as a process solution supply tube and an outer tube acting as a temperature adjusting solution tube.

The process solution supplying apparatus according to one embodiment of the present invention comprises an upstream side manifold mounted on the upstream side of the process solution supply tube for introducing the temperature adjusting solution stream into the temperature adjusting solution tube and a downstream side manifold mounted on the downstream side of the process solution supply tube for withdrawing from the temperature adjusting solution tube the temperature adjusting solution that has passed through the temperature adjusting solution tube and the temperature adjusting solution passageway of the fluid passageway opening-closing valve device.

The process solution supplying apparatus according to one embodiment of the present invention comprises a downstream side manifold mounted on the downstream side of the process solution supply tube for introducing the temperature adjusting solution stream into the temperature adjusting solution tube and an upstream side manifold mounted on the upstream side of the process solution supply tube for withdrawing from the temperature adjusting solution tube the temperature adjusting solution that has passed through the temperature adjusting solution tube and the temperature adjusting solution passageway of the fluid passageway opening-closing valve device.

The process solution supplying apparatus according to one embodiment of the present invention comprises a pair of process solution supply tubes, a first upstream side manifold mounted on the upstream side of one of the process solution supply tube for introducing the temperature adjusting solution stream into the temperature adjusting solution tube mounted to the process solution supply tube, a downstream side manifold mounted on the downstream side of one of the process solution supply tube for withdrawing from the temperature adjusting solution tube the temperature adjusting solution that has passed through the temperature adjusting solution tube and the temperature adjusting solution passageway of the fluid passageway opening-closing valve device, and a second upstream side manifold mounted on the upstream side of the other process solution supply tube for withdrawing from the temperature adjusting solution tube mounted in the process solution supply tube the temperature adjusting solution that has passed through the temperature adjusting solution tube and the temperature adjusting solution passageway of the fluid passageway opening-closing valve.

In the embodiment described above, a pair of double tubes are used such that a temperature adjusting solution supplied into one of these double tubes is withdrawn from the other double tube so as to simplify the piping system of the temperature adjusting solution. In addition, since the temperature of the process solution supply tube is adjusted immediately before the downstream end of the process solution supply tube, the temperature of the process solution can be controlled highly accurately. Incidentally, it is also possible to use a plurality of sets of a pair of double tubes.

In this case, nozzles are mounted at the downstream end of the paired process solution supply tubes, and the downstream side manifold can be formed integral with a nozzle holding unit for holding the nozzles.

It is possible for the nozzle unit to include a liquid reservoir portion to which is connected the downstream ends of the process solution supply tubes and a plurality of nozzles extending from the liquid reservoir portion toward the target substrate to be processed.

According to another aspect of first embodiment of the present invention, the fluid passageway opening-closing valve device includes a first connecting member for connecting the process solution passageway to the process solution supply tube, and a second connecting member covering the first connecting member and serving to connect the temperature adjusting solution passageway to the temperature adjusting solution tube.

According to a second aspect of the present invention, there is provided a fluid passageway opening-closing valve device, comprising a body, a process solution passageway formed in the body and having one open end and the other open end to permit a process solution to flow therethrough, an opening-closing valve mounted within the body for opening-closing the process solution passageway, and a temperature adjusting solution passageway formed in the body, having one open end and the other open end open in the same direction as the one open end and the other open end of the process solution passageway to permit a temperature adjusting solution for adjusting the temperature of the process solution flowing through the process solution passageway to flow therethrough.

According to the particular construction, the temperature of the process solution can be continuously adjusted even at one open end and the other open end.

In the opening-closing valve device of the construction described above, it is desirable for one open end of the process solution passageway to be open within one open end of the temperature adjusting solution passageway and for the other open end of the process solution passageway to be open within the other open end of the temperature adjusting solution passageway. In this case, it is possible for the opening-closing valve device to include a first connecting member for connecting the process solution passageway to the tube and a second connecting member covering the first connecting member and serving to connect the temperature adjusting solution passageway to the tube.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A process solution supplying apparatus according to one embodiment of the present invention will now be described with reference to the accompanying drawings.

The process solution supplying apparatus of the present invention is used for supplying a temperature-adjusted process solution such as a developing solution or a resist solution to a developing device or a resist coating device included in, for example, an apparatus for manufacturing a semiconductor device. The apparatus in this embodiment is for supplying a developing solution to a developing device.
(Basic Construction)

Figure 2:
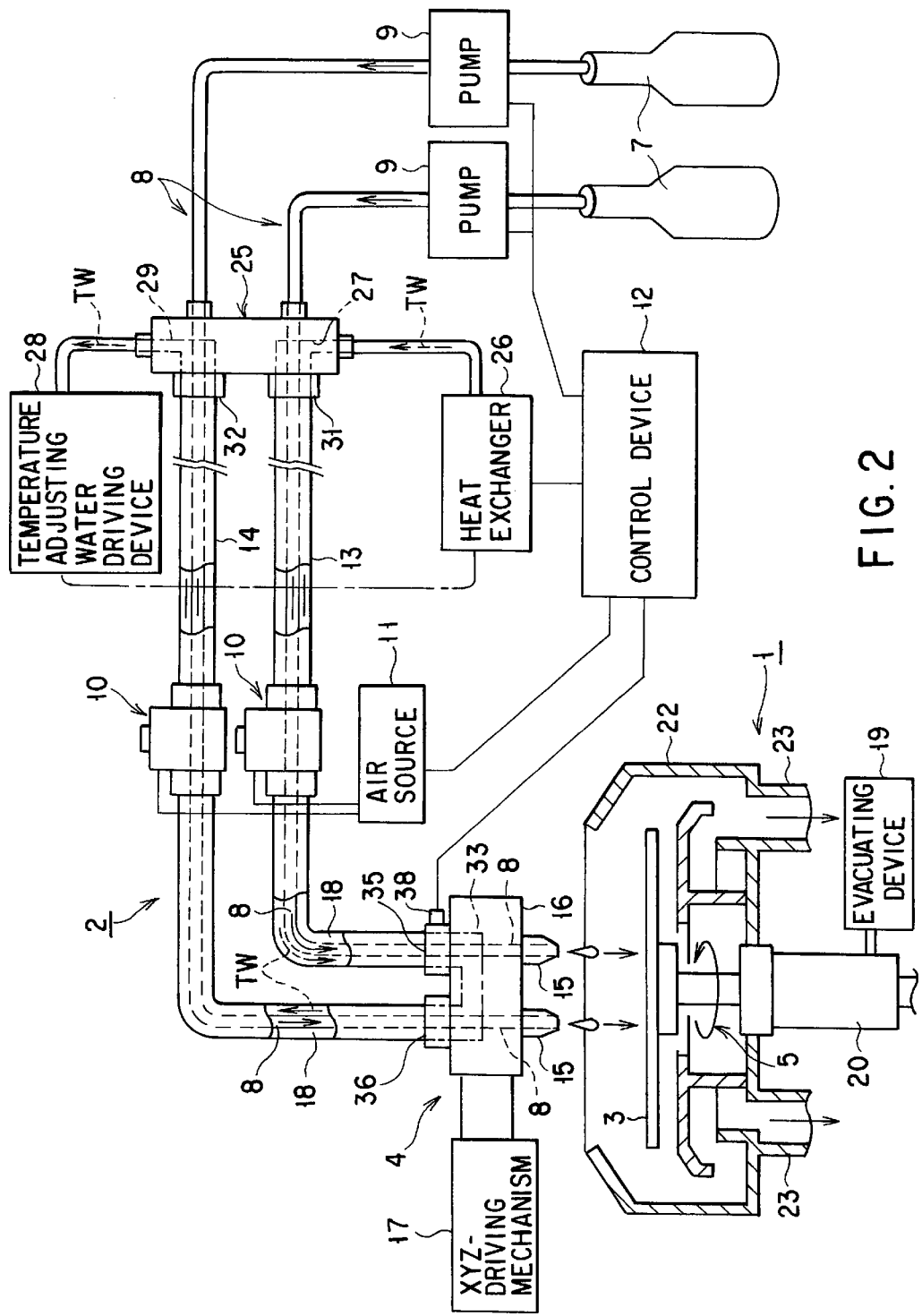
FIG. 2 schematically shows the construction of process solution supplying apparatus according to one embodiment of the present invention.

FIG. 2 schematically shows the construction of a developing device 1 mounted in an apparatus for manufacturing a semiconductor device and a developing solution supply device 2 (i.e., a process solution supplying apparatus 2 of the present invention) connected to the developing device 1.

The developing device 1 includes a nozzle unit 4 for supplying a developing solution (process solution) to the surface of a semiconductor wafer 3 (target substrate to be processed) and a spin chuck mechanism 5 for rotating the semiconductor wafer 3 while holding the wafer 3 thereon by vacuum suction. The semiconductor wafer 3 is rotated by the spin chuck mechanism 5 so as to permit the developing solution supplied to the surface of the semiconductor wafer 3 to be spread, with the result that the developing solution is supplied uniformly over the entire surface of the semiconductor wafer 3.

On the other hand, the developing solution supplying apparatus 2 includes a pair of developing solution tanks 7 (process solution supply source) each storing a developing solution, and a pair of developing solution supply tubes 8 extending from the developing solution tanks 7 so as to be connected finally to the nozzle unit 4 of the developing device 1. A pump 9 for pumping the developing solution and an opening-closing valve device 10 (air operation valve) for controlling the supply timing of the developing solution are mounted to each of the developing solution supply tubes 8. An air source 11 for operating the opening-closing valve device 10 and the pump 9 are connected to a control device 12 such that a predetermined amount of the developing solution is supplied at a predetermined timing to the nozzle unit 4 based on a command signal issued from the control device 12.

The apparatus in this embodiment is featured mainly in that, in the developing solution supplying system of the particular construction, the entire region of the downstream side of the pair of developing solution supply tubes 8 including the opening-closing valve devices 10 is formed of double tubes 13 and 14 each consisting of an inner tube acting as the developing solution supply tube 8 and an outer tube acting as a temperature controlling water (hereinafter referred to as a temperature controlling water TW) tube 18.

Let us describe briefly the construction of the developing device 1 and, then, describe in detail the developing solution supplying apparatus 2.
(Developing Device)

As already described, the developing device 1 includes the nozzle unit 4 and the spin chuck mechanism 5. These nozzle unit 4 and the spin chuck mechanism 5 are arranged within a chamber (not shown). An air supply-discharge system (not shown) is connected to the chamber to maintain the inner space of the chamber at a predetermined process atmosphere. The semiconductor wafer 3 to be processed is transferred by a wafer transfer arm (not shown) into the chamber so as to be delivered onto the spin chuck mechanism 5.

The nozzle unit 4 includes a pair of developing solution supply nozzles 15 for supplying a developing solution onto the wafer 3, a holder 16 for holding the supply nozzles 15, and an XYZ-driving mechanism 17 for driving the holder 16 in XYZ-directions for determining the position of the holder 16.

The developing solution supply nozzle 15 is fixed to the lower surface of the holder 16 such that the discharge port of the nozzle 15 faces the semiconductor wafer 3. Also, the holder 16 holds the developing solution supply tube 8 extending from the process solution supplying apparatus such that the tube 8 is held coaxial with the nozzle 15.

The nozzle unit 4 is moved by operating the XYZ-driving mechanism 17 to permit the supply nozzle 15 to be positioned to face a desired position of the semiconductor wafer 3. When the nozzle 15 is positioned as desired, the developing solution supplying apparatus 2 delivers an appropriately controlled amount of the developing solution at a predetermined timing so as to supply the developing solution from the supply nozzle 15 onto the semiconductor wafer 3.

On the other hand, an evacuating device 19 is operated to permit the semiconductor wafer 3 to be held by vacuum suction on the spin chuck mechanism 5. At the same time, the a rotary driving mechanism 20 is operated to rotate the semiconductor wafer 3 at a predetermined rotating speed. As a result, the developing solution supplied onto the semiconductor wafer 3 is centrifugally diffused to permit the developing solution to be supplied uniformly over the entire surface of the wafer 3.

The spin chuck mechanism 5 is arranged within a cup 22. The excess developing solution coming out of the edge portion of the semiconductor wafer 3 is collected by the cup 22, with the result that the excess developing solution is prevented from being scattered. Also, a discharge tube 23 is connected to a bottom portion of the cup 22. The excess developing solution collected by the cup 22 flows through the discharge tube 23 so as to be recovered in a tank (not shown).

(Process Solution Supplying Apparatus)

The developing solution supplying apparatus 2 (process solution supplying apparatus) connected to the nozzle unit 4 will now be described in detail.

As already described, the developing solution supplying apparatus of this embodiment is featured in that the downstream side of the pair of developing solution supply tubes 8 including the opening-closing valve devices 10 is formed of double tubes (13, 14) each consisting of an inner tube acting as the developing solution supply tube 8 and an outer tube acting as the temperature adjusting water (TW) tube 18.

To be more specific, a manifold 25 is mounted in the middle portion of each of the developing solution supply tubes 8. Also, first and second double tubes 13, 14 including the pair of the developing solution supply tubes 8 as the inner tubes are mounted between the manifold 25 and the holder 16 of the supply nozzle unit 4. The manifold 25 serves to connect the developing solution supply tubes 8 extending from the upstream side to the inner tubes of the first and second double tubes 13, 14, respectively. An inlet port 27 of the temperature adjusting water TW that is connected to a heat exchanger 26 (temperature adjusting water supply mechanism) and an outlet port 29 of the temperature adjusting water TW that is connected to a temperature adjusting water driving device 28 (temperature adjusting water supply mechanism) are formed in the manifold 25. The inlet port 27 is connected to the outer tube of the first double tube 13. Also, the outlet port 29 is connected to the outer tube B of the second double tube 14. The manifold 25 and the double tubes 13, 14 are joined to each other by fixing tools 31, 32.

A connecting passageway 33 for connecting the outer tubes of the first double tube 13 and the second double tube 14 is formed within the holder 16 of the nozzle unit 14. The holder 16 and the first and second double tubes 13, 14 are joined to each other by fixing tools 35, 36.

Therefore, the temperature adjusting water tube 18 extends from the inlet port 27 of the manifold 25 to enter the outer tube of the first double tube 13 and, then, is folded at the connecting passageway 33 within the holder 16 to enter the outer tube of the second double tube 14 so as to reach the outlet port 29 of the manifold 25.

A temperature sensor 38 for measuring the temperature of the developing solution supplied to the surface of the semiconductor wafer 3 is mounted to the holder 16. The output of the temperature sensor 38 is supplied to the control device 12. Upon receipt of the output signal from the temperature sensor 38, the control device 12 controls the heat exchanger 26 so as to control appropriately the temperature of the temperature adjusting water TW supplied into the temperature adjusting water tube 18.

Figure 1:
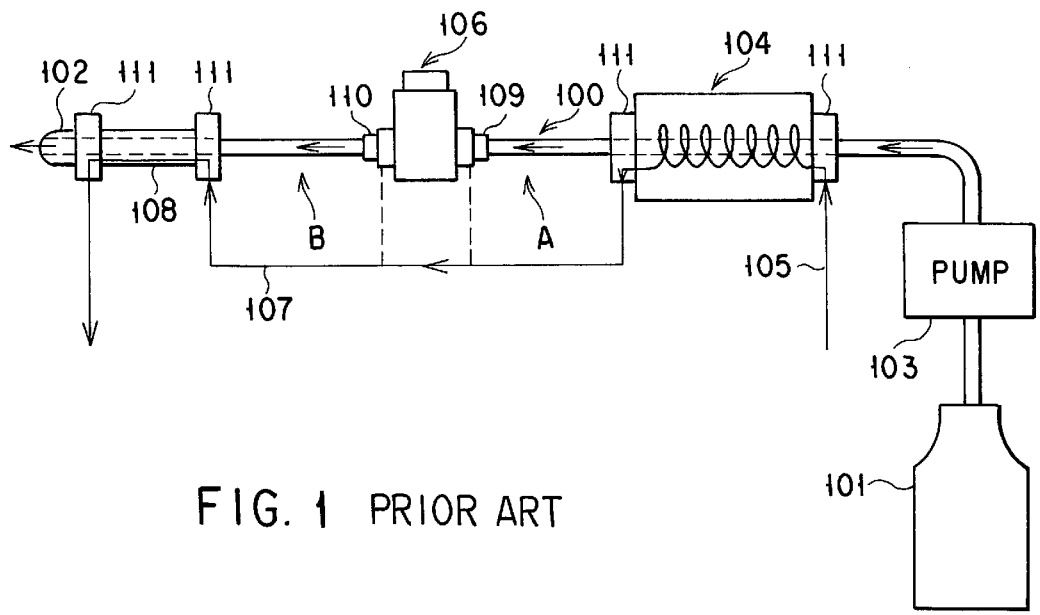
FIG. 1 schematically shows the construction of a conventional process solution supplying apparatus.
Figure 3:
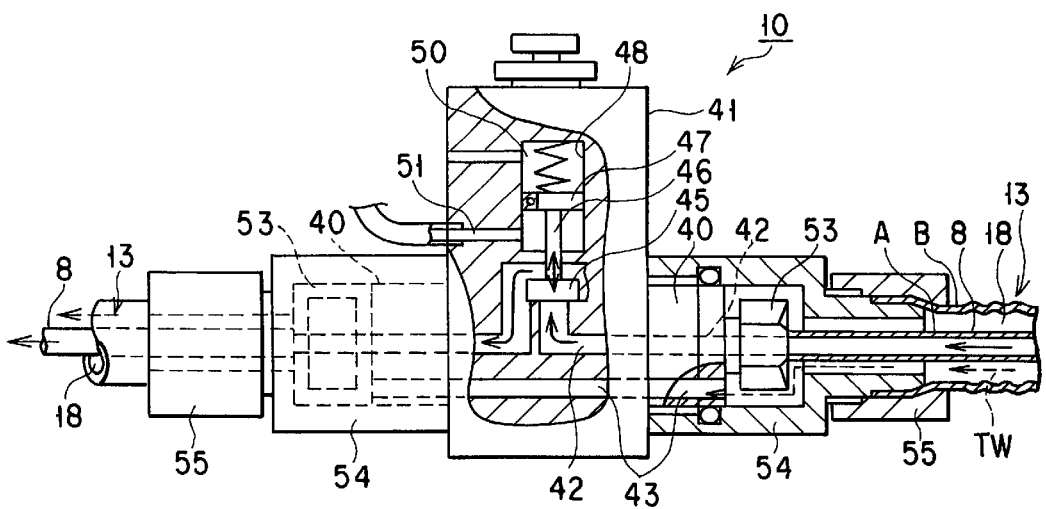
FIG. 3 is a front view, partly broken away, showing the fluid passageway opening-closing valve device included in the process solution supply apparatus of the present invention.

Further, the opening-closing valve devices 10 arranged downstream of the manifold 25 can be coaxially connected to the first and second double tubes 13, 14, respectively, in the developing solution supplying device 2. FIG. 3 shows the construction of the opening-closing valve device 10.

The opening-closing valve device 10 shown in FIG. 3 is connected to the first double tube 13. The opening-closing valve device 10 connected to the second double tube 14 is similarly constructed and, thus, the description thereof is omitted.

The opening-closing valve device 10 comprises a body 41 having a connecting portion 40 arranged on each of the upstream side and the downstream side. The connecting portion arranged on the downstream side is not shown in the drawing. A developing solution passageway 42 and a temperature adjusting water passageway 43 are arranged in parallel within the body 41. Also, an opening-closing valve body 45 that is shaped like a Japanese letter "コ" is arranged within the developing solution passageway 42.

The valve body 45 is connected to a piston 47 via a rod 46. The piston 47 is held movable within a cylinder 48 formed within the body 41 to open or close the valve body 45. Also, the piston 47 is urged by a spring 50 in a direction to close the valve body 45 (developing solution passageway 42).

Further, an air supply passageway 51, which is connected to an air source 11 shown in FIG. 2, is formed on the lower end side of the cylinder 48. Therefore, if a pressurized air is supplied to the lower side of the piston 47 by operating the air source 11, the valve body 45 is opened by the upward movement of the piston 47.

On the other hand, the both ends of each of the developing solution passageway 42 and the temperature adjusting water passageway 43 are open at the end faces of the connecting portion 40. The developing solution passageway 42 is coaxially connected to the inner tube A (developing solution supply tube 8) of the first double tube 13 via a nut-shaped first connecting member 53. On the other hand, the temperature adjusting water passageway 43 communicates with the outer tube B (temperature adjusting water tube 18) of the second double tube 13 via a cup-shaped second connecting member 54 covering the first connecting member 53.

The opening-closing valve device 10 is connected to the first double tube 13 as follows. In the first step, the opening-closing valve device 10 and the first double tube 13 are held separately from each other. Under this condition, the second connecting member 54 is fixed to the outer tube B of the first double tube 13 by the fixing tool 55. Since the first double tube 13 is formed of a flexible material such as a Teflon resin, the outer tube B is deformed to withdraw the tip portion of the inner tube A from the open side of the connecting member 54 toward the opening-closing valve device 10. Under this condition, the inner tube A is joined to the connecting portion 40 (developing solution passageway 42) by using the first connecting member 53. Then, the deformed outer tube B is brought back to the original state and is joined to the body 41 such that the first connecting member 53 and the connecting portion 40 are covered with the cup-shaped second connecting member 54. A seal member 57 such as an O-ring is fitted in the inner circumferential surface of the second connecting member 54 so as to seal liquid-tight the clearance between the second connecting member 54 and the outer circumferential surface of the connection portion 40.

The first double tube 13 on the downstream side is also connected similarly to the opening-closing valve device 10 and, thus, the description as to how the connection is achieved is omitted.

As described above, the opening-closing valve device 10 is constructed to be coaxially connected to the first double tube 13. In addition, the temperature of the developing solution can be continuously adjusted even within the opening-closing valve 10.

(Function and Effect)

The developing solution supplying apparatus of the construction described above is operated as follows.

It should be noted that, during the period between the time when the temperature adjusting water TW enters the first double tube 13 and the time when the temperature adjusting water TW is withdrawn from the second double tube 14, the temperature adjusting water TW exchanges heat with the developing solution flowing through the inner tubes of each of the first and second double tubes 13 and 14 so as to control the temperature of the developing solution at, for example, 23+0.2° C. The temperature control is performed by the feed back control using the temperature sensor 38 and a heat exchanger 26.

A predetermined temperature difference is generated between the "going" temperature adjusting water TW flowing through the first double tube 13 toward the nozzle unit 4 and the "returning" temperature adjusting water TW flowing through the second double tube 14 away from the nozzle unit 4. However, the influence given by the temperature difference can be suppressed at a minimum level because the number of intermediates such as a manifold and a flange mounted to the passageway of the temperature adjusting water TW is small.

As an example, each of the first and second double tubes 13 and 14 was actually prepared by using an outer tube sized at φ12×φ17 (mm) and an inner tube sized at φ6.35×φ4.35 (mm). It is possible to use the same material for preparing the double tubes 13, 14 over the entire length. Alternatively, the material of the double tube on the downstream side of the opening-closing valve device 10 may be different from the material on the upstream side of the valve device 10. In this example, the length of the tube between the nozzle unit 4 and the opening-closing valve device 10 was about one meter. Since this portion is movable, the tube in this portion was formed of a fluoroplastic resin tube having a flexibility. On the other hand, the tube between the opening-closing valve device 10 and the manifold 25 was long, i.e., about 3 m long, and not movable, this portion of the tube was formed of a hose having an olefinic net buried therein in view of economy. It should also be noted that the temperature adjusting performance can be improved by selecting the material, e.g., a heat insulating material, depending on the site of the tube.

The particular construction of the present invention described above permits producing prominent effects as summarized below:

1. The downstream side of the developing solution supply tube 8 including the opening-closing valve device 10 is of a double tube structure over the entire region of the downstream side. In addition, the continuous temperature adjusting water tube 18 is arranged to cover the developing solution tube 8. The particular construction allows the developing solution not to be susceptible to a disturbance, making it possible to perform the temperature adjustment stably with a high accuracy.

2. Since the temperature adjusting tube 18 is continuous, it is possible to decrease the number of manifolds for branching the stream of the temperature adjusting water, leading to a simplified construction of the apparatus. In addition, the manufacturing cost of the apparatus can be lowered, and the maintenance of the apparatus can be facilitated.

3. Since the apparatus is constructed such that the opening-closing valve device 10 can be coaxially connected to the first and second double tubes 13 and 14, the temperature of the developing solution can be adjusted continuously in these connecting portions, too, with the result that the temperature adjustment is not interrupted.

4. Since the double tubes 13 and 14 used as a set are arranged such that the temperature adjusting water tubes included in these double tubes are connected to each other within the nozzle unit 4, the temperature adjusting water passageway is folded within the nozzle unit 4. It follows that the temperature adjusting water TW can be introduced into and withdrawn from these double tubes 13, 14 at the upstream ends of these tubes. The particular construction facilitates the arrangement of the temperature adjusting tube.

The present invention is not limited to the embodiment described above. Of course, various modifications are available within the technical scope of the present invention.

Figure 4A:
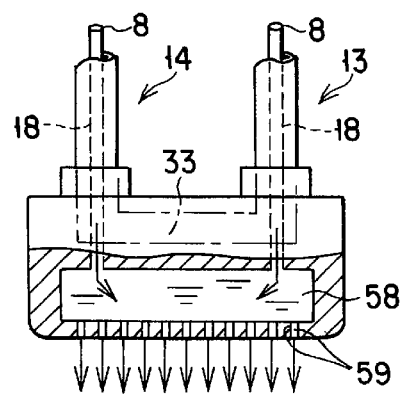
FIGS. 4A and 4B are cross sectional views schematically showing the construction of a nozzle unit included in the process solution supply apparatus of the present invention.

For example, in the embodiment described above, the nozzle unit 4 is constructed such that the downstream ends of the developing solution supply tube 8 are in direct contact with nozzles 15 (i.e., straight nozzle unit). However, it is also possible to employ a shower nozzle unit 56 shown in FIG. 4A.

As shown in the drawing, the shower nozzle unit 56 comprises a liquid reservoir portion 58 to which are connected the downstream ends of the developing solution supply tubes 8 and a large number of nozzles 59 extending outward from the liquid reservoir portion 58. In the case of the shower nozzle unit 56 of the particular construction, the developing solution streams supplied through different developing solution supply tubes 8 are mixed within the liquid reservoir portion 58, with the result that the temperature of the developing solution is made uniform.

Figure 4B:
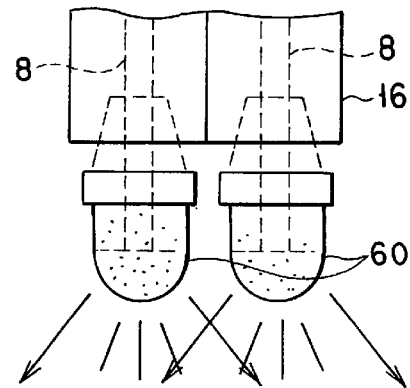

It is also possible to employ as the nozzle unit 4 a spray nozzle unit in which spray nozzles 60 are mounted to the developing solution supply tubes 8 as shown in FIG. 4B.

Further, where the process solution supplying apparatus of the present invention is used in a resist coating apparatus, it is possible to arrange a suck back valve device downstream of the opening-closing valve device 10. The suck back valve device is a special valve device for preventing the air from being sucked from the downstream end of the resist supply pipe. If connected coaxially to the first and second double tubes 13 and 14 like the opening-closing valve devices, the suck back valve devices do not impair the effect of the present invention.

Figure 5:
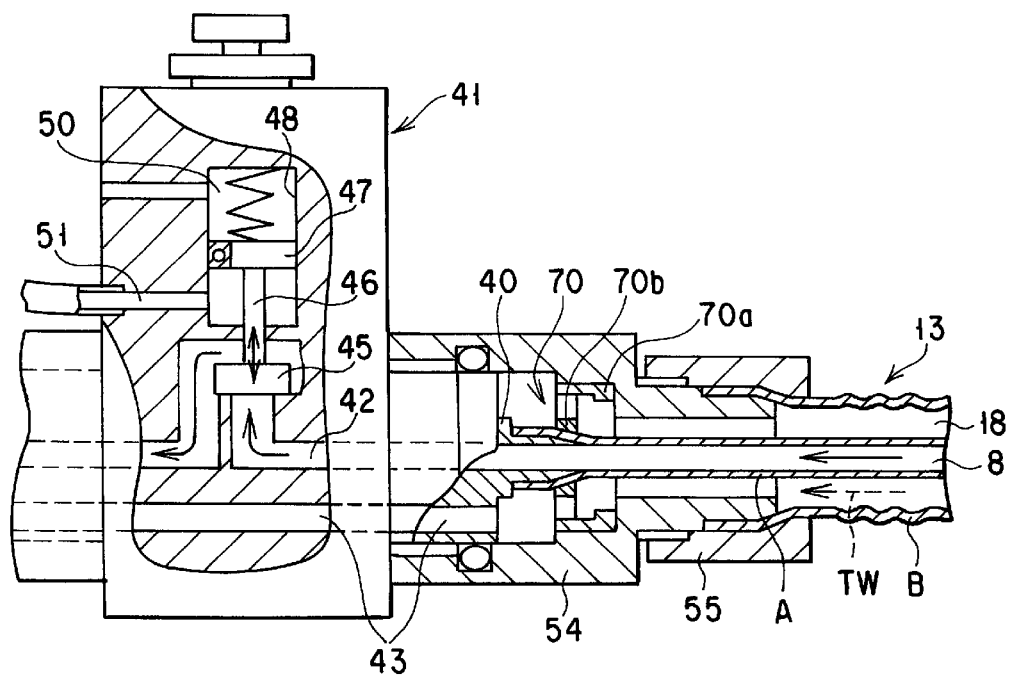
FIG. 5 is a front view, partly broken away, showing the fluid passageway opening-closing valve device according to another embodiment of the present invention.

The construction of the opening-closing valve device 10 is not limited to that shown in FIG. 3. Alternatively, the valve device 10 may be constructed as shown in FIG. 5. In FIG. 5, the members of the valve device equal to those shown in FIG. 3 are denoted by the same reference numerals so as to avoid the overlapping description.

What should be noted is that, in the embodiment shown in FIG. 3, the inner tube A of the first double tube 13 is fixed to the connecting portion 40 of the body 41 by using the nut-shaped first connecting member 53. In the embodiment shown in FIG. 5, however, a spacer 70 is used in place of the nut-shaped first connecting member 53 for fixing the inner tube A to the connecting portion 40.

To be more specific, the spacer 70 is of a double ring structure consisting of an outer ring 70a and an inner ring 70b. The outer ring 70a is fitted with the inner surface of the second connecting member 54, and the inner ring 70b serves to push the inner tube A of the double tube 13 against the connecting portion 40 so as to achieve a desired fixation. It should also be noted that, since the spacer 70 is of a double ring structure, the stream of the temperature adjusting water TW flowing out of the temperature adjusting water tube 18 consisting of the outer tube B of the double tube 13 is not obstructed so as, to be continuously guided into the fluid passageway 43 of the opening-closing valve device 10.

The construction shown in FIG. 5 makes it possible to connect the tubes easily without using a nut-like fastening tool, leading to an improved workability in the assembling step.

Figure 6:
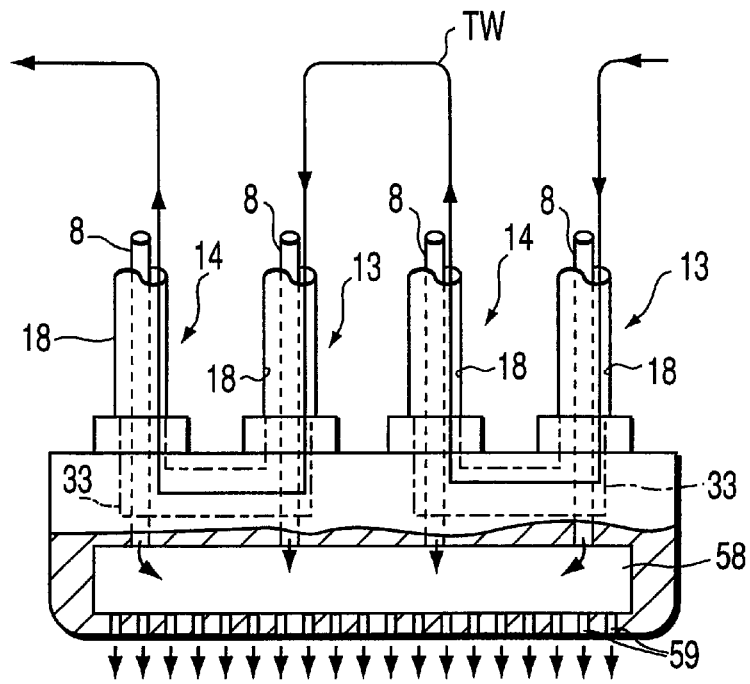
FIG. 6 is a cross sectional view schematically showing the construction of a nozzle according to another embodiment of the present invention.

In the embodiment described above, the process solution supplying apparatus is provided with only a single pair of double tubes 13 and 14. Alternatively, it is possible to provide a plurality of pairs of double tubes, as shown in FIG. 6. In this case, all the temperature adjusting water tubes 18 are connected in series to permit the temperature adjusting water TW to be circulated as denoted by arrows of solid lines. A shower nozzle is employed in the arrangement shown in FIG. 6 as in FIG. 4A. However, it is also possible to use a straight nozzle in place of the shower nozzle in the arrangement shown in FIG. 6.

Figure 7:
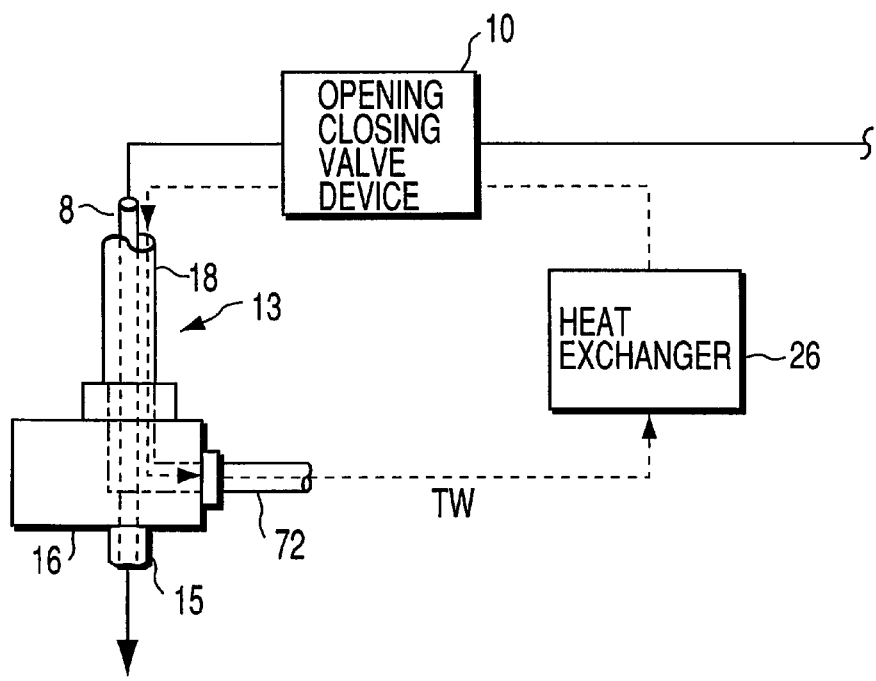
FIG. 7 schematically shows the construction of process solution supplying apparatus according to another embodiment of the present invention.

It is not absolutely necessary to use a pair of double tubes 13 and 14. Alternatively, it is possible to use a single double tube 13 as shown in FIG. 7. In this case, it is desirable to form an outlet port 72 of the temperature adjusting water TW in the holder 16.

Figure 8:
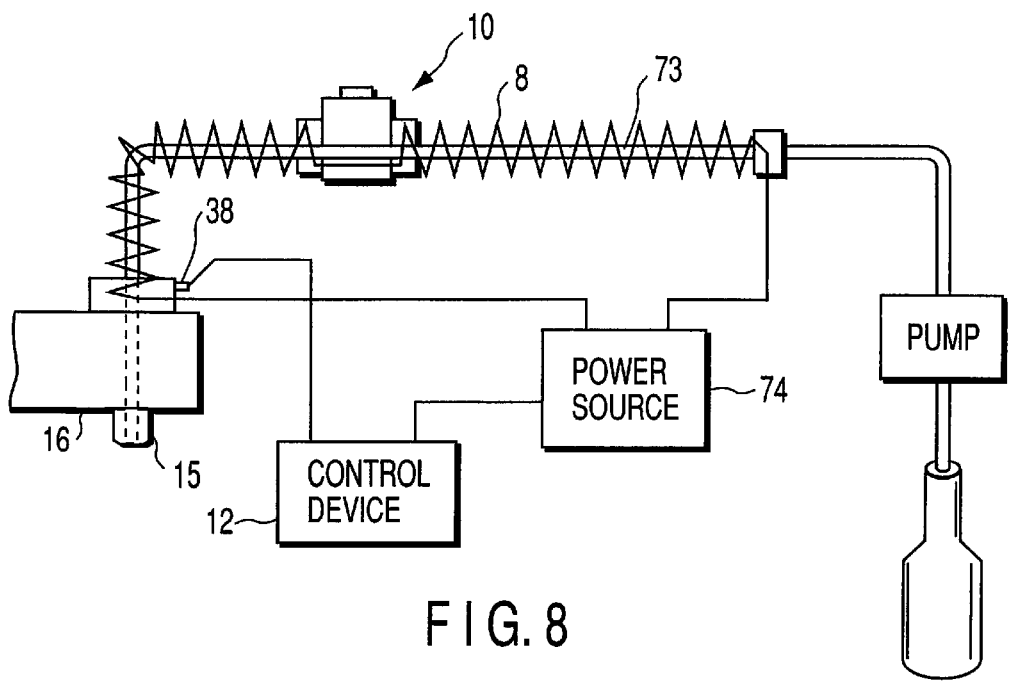
FIG. 8 schematically shows the construction of process solution supplying apparatus according to another embodiment of the present invention.

In the embodiment described above, the temperature adjusting water TW is used as a temperature adjusting medium. However, any kind of the temperature adjusting medium can be used as far as the temperature of the process solution can be adjusted. For example, it is possible to use a heater of a heating wire. In this case, it suffices to wind an electric heater 73 of the heating wire around the developing solution supply pipe 8 over the entire length of the downstream portion including the opening-closing valve device 10, as shown in FIG. 8. As shown in the drawing, the electric heater 73 is connected to a power source 74 that is controlled by the control device 12. The control device 12 controls the electric heater 73 at a desired temperature based on the temperature information detected by the temperature sensor 38 mounted to the holder 16.

In the case of using the electric heater 73, it is possible to control more finely the temperature of the developing solution circulated through the developing solution supply tube 8. It is desirable to control the temperature of the electric heater 73 in conformity with the on-off timing of the developing solution, i.e., in conformity with the opening-closing of the opening-closing valve device 10. To be more specific, when the valve device 10 is opened to permit the developing solution to be circulated through the tube 8, the developing solution is moved within the tube 8, making it necessary to increase the heat output of the heater 73, compared with the time when the valve device 10 is closed.

Also, in the embodiment described above, each of the double tubes 13 and 14 consists of the inner tube A acting as the developing solution supply tube 8 and the outer tube B acting as the temperature adjusting water tube 18. By contraries, it is possible to use a double tube consisting of the inner tube A acting as the temperature adjusting water tube 18 and the outer tube B acting as the developing solution supply tube 8.

Figure 9:
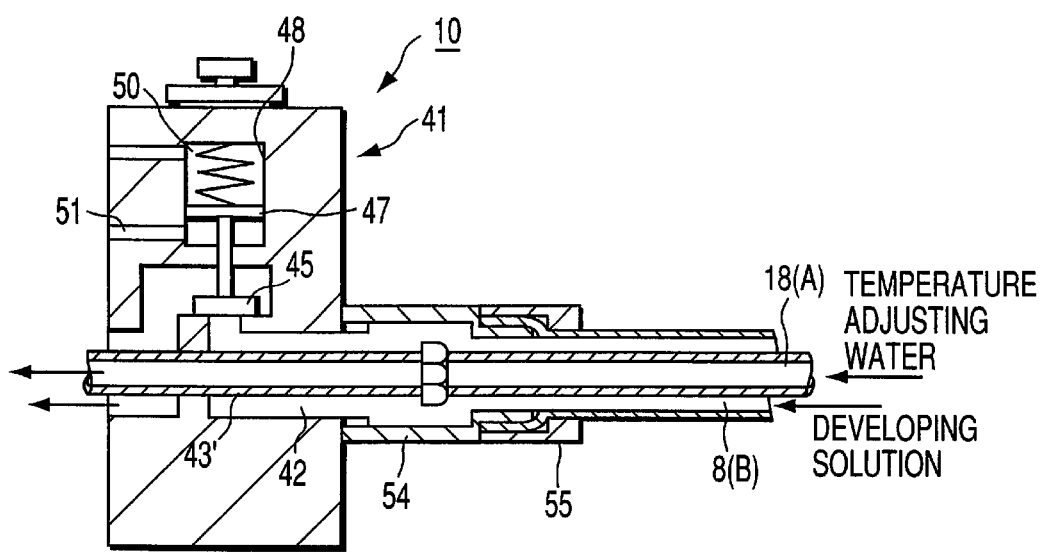
FIG. 9 is a front view, partly broken away, showing the fluid passageway opening-closing valve device according to another embodiment of the present invention.
Figure 10:
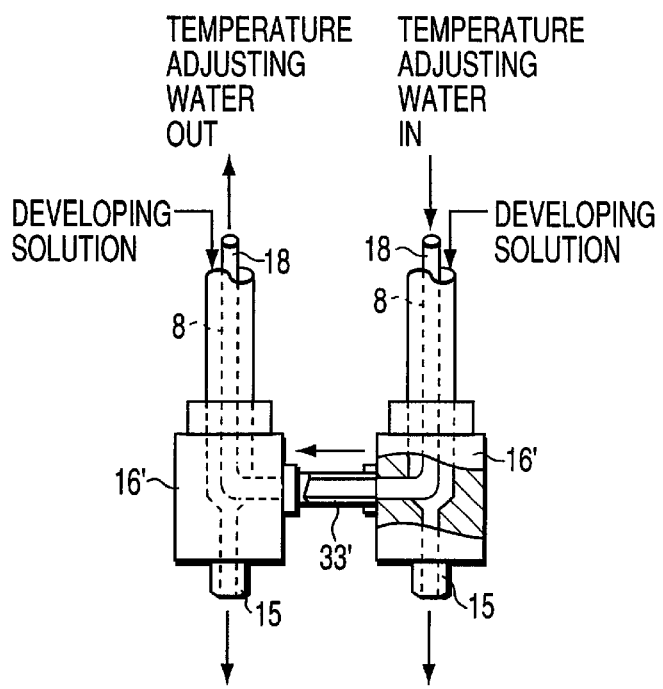
FIG. 10 is a cross sectional view schematically showing the construction of a nozzle according to another embodiment of the present invention.

In this case, it is desirable to use a fluid passageway opening-closing valve constructed as shown in FIG. 9 and a nozzle unit 16' constructed as shown in FIG. 10. The fluid passageway opening-closing valve shown in FIG. 9 is constructed such that the temperature adjusting solution passageway 43 is open inside the developing solution passageway 42 at the portion of the connecting port. Therefore, it is necessary to connect the developing solution passageway 42 to the developing solution tube 8 after the temperature adjusting solution passageway 43 is connected to the temperature adjusting tube 18 included in the double tube.

In the embodiment described above, used are double tubes. Alternatively, it is also possible to use a triple tube. In this case, the temperature adjusting water is circulated through both the innermost tube and the outermost tube, with the developing solution being circulated through the intermediate tube. In the case of using the triple tube, the temperature of the developing solution can be controlled more effectively. Needless to say, the valve device 10 should also be of a triple tube structure in the case of using the triple tube.

Figure 11A:
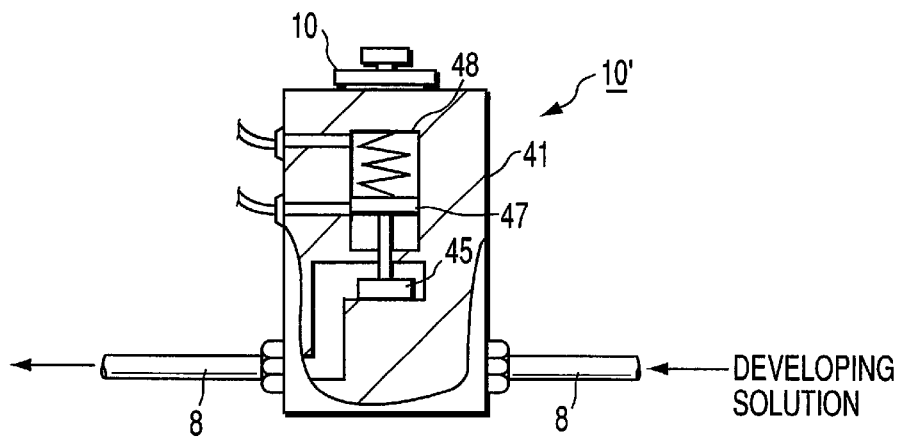
FIGS. 11A and 11B are a longitudinal sectional view and a cross-sectional view and a front view, partly broken away, showing the fluid passageway opening-closing valve device according to another embodiment of the present invention.
Figure 11B:
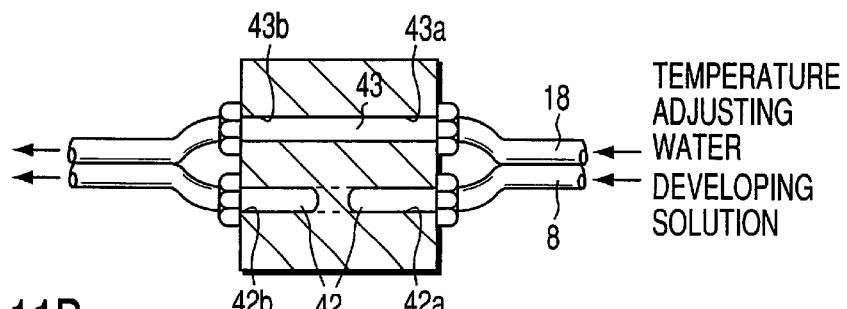

It should also be noted that the temperature adjusting solution tube may be simply connected to the developing solution tube in place of using a double tube or a triple tube. In this case, it suffices to construct the fluid passageway opening-closing valve 10' as shown in FIG. 11B. In this case, ports 43a, 43b of the temperature adjusting solution passageway 43 are arranged in parallel with ports 42a, 42b of the developing solution passageway 42. Also, the temperature adjusting solution passageway 43 extends directly through a body 43 of an opening-closing valve device 10'. Further, an opening-closing valve 45 is arranged in the intermediate portion of the developing solution passageway 42.

Further, as already described, the process solution supplying apparatus of the present invention is not limited to a developing solution supplying apparatus. For example, the process solution supplying apparatus of the present invention can also be used as a resist solution supplying apparatus for supplying a resist solution to a resist coating apparatus. Further, when it comes to an apparatus for manufacturing a semiconductor device in which a resist coating device and a developing device are stacked one upon the other, it is possible to connect the temperature adjusting water tube 18 of the developing solution supplying apparatus 2 to a temperature adjusting water tube of the resist coating device to form an integral single system.

Needless to say, the technical idea of the present invention can be embodied in variously modified fashions within the technical scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fluid passageway opening-closing valve device, comprising:

a valve body;

a process solution passageway formed in said valve body and having one open end and a second open end to permit a process solution to flow there through;

a valve mounted within the valve body and configured to open or close said process solution passageway; and a temperature adjusting liquid passageway formed in said valve body, having one open end and a second open end open in the same direction as said one open end and said second open end of said process solution passageway to permit a temperature adjusting liquid for adjusting the temperature of the process solution flowing through said process solution passageway to flow there through a downstream side manifold and a second upstream side manifold, and wherein said one open end of said temperature adjusting liquid passageway is open within said one open end of said process solution passageway, and said second open end of said temperature adjusting liquid passageway is open within said second open end of said process solution passageway.

* * * * *